Sept. 29, 1964
P. THIEME
3,150,457
FILM-HOLDING DEVICES
Filed April 23, 1962
2 Sheets-Sheet 2
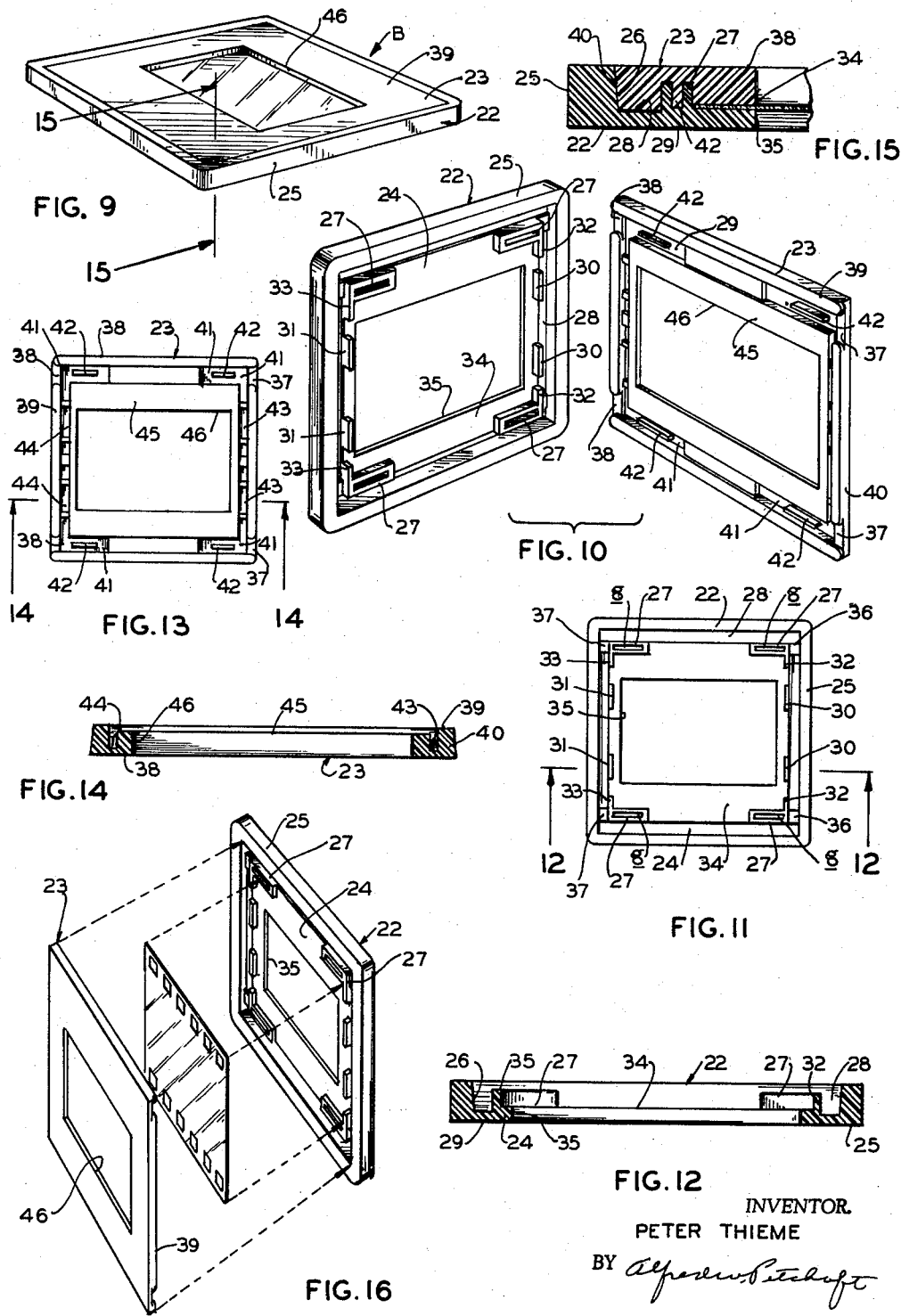
INVENTOR.
PETER THIEME
BY *[signature]*
ATTORNEY United States Patent Office 3,150,457
Patented Sept. 29, 1964

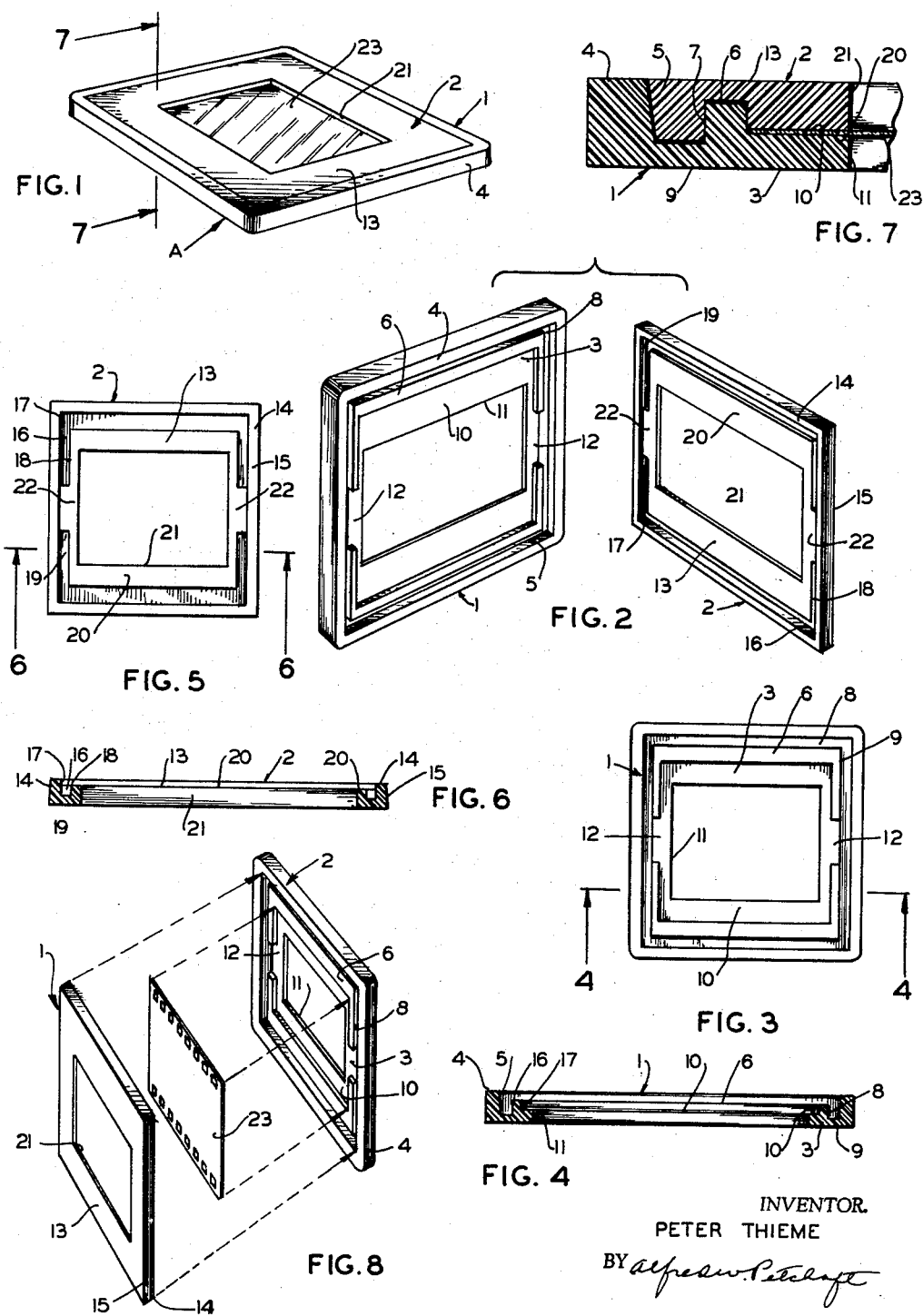

3,150,457
FILM-HOLDING DEVICES
Peter Thieme, Riemekestrasse 144, Paderborn, Germany
Filed Apr. 23, 1962, Ser. No. 189,374
9 Claims. (Cl. 40—152)

This invention relates in general to certain new and useful improvements in devices for holding film transparencies and, more particularly, to an improved type of holding device formed of two interlocking frames.

The presently existing film-holding devices which contain two interlocking frames are inefficient and costly to manufacture. These frames usually are formed with laterally projecting locking elements so that two mating frames may be snapped together in mounting a film transparency. Such devices must be manufactured with very close tolerances so that the two component parts of the frame can be put together without damaging the film. If there is a slight degree of error in size or shape the frames will not fit into each other properly and there is a great possibility that the film transparency may be injured or completely destroyed. This is particularly true when the film transparencies and frames are assembled automatically by some mechanical device.

Since film transparencies are irreplaceable items and usually possess much sentimental value, damage or destruction thereof is quite serious. If a transparency is injured during the mounting process it is oftentimes impossible to replace such transparency.

Because of the close tolerances required in the fabrication of laterally projecting or protuberant connections, the tooling cost is very high. Moreover, synthetic resin film-holders tend to warp because of fluctuations in atmospheric conditions, such as temperature and humidity. Under such conditions, frames having lateral projections or protuberances become completely useless.

It is, therefore, the primary object of the present invention to provide a film-holding device in which the component parts can be rapidly assembled eliminating any possibility of injury to the film transparency.

It is another object of the present invention to provide a film-holding device of the type stated which can be rapidly assembled, and is really adaptable to machine mounting techniques.

It is a further object of the present invention to provide a film-holding device of the type stated which is not vulnerable to warpage or change in size because of fluctuations in atmospheric conditions, but will remain operative and usable in spite of distortion due to warping so long as the distortion is not excessive.

It is also an object of the present invention to provide a film-holding device of the type stated which can be rapidly manufactured and mass produced at a low cost.

With the above and other objects in view, my invention resides in the novel features of form, construction, arrangement, and combination of parts presently described and pointed out in the claims.

In the accompanying drawings (two sheets)—

FIG. 1 is a perspective view of a film-holding device constructed in accordance with and embodying the present invention;

FIG. 2 is a perspective view of the two component parts of the film-holding device in separated juxtaposition;

FIG. 3 is a top plan view of the lower frame forming part of the film-holding device;

FIG. 4 is a sectional view taken along line 4—4 of FIG. 3;

FIG. 5 is a bottom plan view of the upper frame forming part of the film-holding device.

FIG. 6 is a sectional view taken along line 6—6 of FIG. 5;

FIG. 7 is a fragmentary sectional view taken along line 7—7 of FIG. 1;

FIG. 8 is an exploded perspective view presenting the method of assembly of the various components of the film-holding device;

FIG. 9 is a perspective view of a modified form of film-holding device constructed in accordance with and embodying the present invention;

FIG. 10 is a perspective view of the two component parts of the modified form of film-holding device in separated juxtaposition;

FIG. 11 is a top plan view of the lower frame forming part of the modified form of film-holding device;

FIG. 12 is a sectional view taken along line 12—12 of FIG. 11;

FIG. 13 is a bottom plan view of the upper frame forming part of the modified form of film-holding device;

FIG. 14 is a sectional view taken along line 14—14 of FIG. 13;

FIG. 15 is a fragmentary sectional view taken along line 15—15 of FIG. 9; and

FIG. 16 is an exploded perspective view presenting the method of assembly of the various components of the modified form of film-holding device.

Referring now in more detail and by reference characters to the drawings which illustrate preferred embodiments of the present invention, A designates a film-holding device comprising an outer frame 1 and an inner frame 2, both of which have a rectangular shape and are preferably formed of a synthetic resin material, such as plasticized rubber-polystyrene mixtures, polyethylene, or polypropylene.

The outer frame 1 comprises a base 3 provided around its entire periphery with an integral wall-forming flange 4 having an inclined interior face 5. Also integrally formed on the base 3 and extending outwardly therefrom are U-shaped inner flanges 6, 7, having internal annular faces 8 which are spaced from the flange 4 thereby defining a rectilinear groove 9 having a flat bottom surface. It will, of course, be noted that the height of the inner flange 6 above the bottom wall 9 is less than the corresponding dimension of the flange 4. The area of the base 3 which is bound by the flange 6 forms a film retaining pocket 10 which is centrally provided with a rectilinear aperture 11. By reference to FIG. 4, it can be seen that the groove 8 has a depth which is slightly greater than that of the film retaining pocket 10. The inner flanges 6, 7, are spaced endwise from each other across the transverse center line of the outer frame 1 in the provision of transverse grooves 12 which have a depth equal to the depth of the film retaining pocket 10, for reasons which will presently more fully appear.

The inner frame 2 comprises a rectilinear base 13 which is provided around its entire peripheral margin with an inclined exterior annular face 14 and is adapted for snug-fitting telescopic disposition within the groove 8 of the outer frame 1. Moreover, the base 13 is provided with two U-shaped grooves 15, 16, having bottom surfaces, 17, 18, and being separated by transverse spurs 19 for snugly fitting around and embracing the U-shaped inner flange 7 of the outer frame 1. Within the area bounded by the grooves 15, 16, the inner frame 2 is provided with a flat face 20 which cooperates with the pocket 10 to retain the film transparency securely in place. The base 13 is provided with a viewing aperture 21 which lies in marginal registration with the viewing apertures 11 when the outer and inner frames 1, 2, respectively, are disposed in assembled relation as shown in FIG. 1. The relative size of the interfitting parts of the outer frame 1 and the inner frame 2 are such that the annular face 14 of the inner frame 2 will abut snugly against the interior face 5 of the outer frame 1. Similarly, the U-shaped flanges 6, 7, of the outer frame 1 will fit snugly within the matching U-shaped grooves 15, 16. Finally, the transverse spurs 19 of the inner frame 2 will fit snugly within the transverse grooves 12 of the outer frame 1. All of the lateral surfaces of the U-shaped grooves 15, 16, and the transverse spurs 19 abut snugly against the complementary surfaces of the U-shaped flanges 6, 7, and transverse grooves 12 so that when the inner frame 2 is pressed into the outer frame 1 the abutting surfaces will fit together tightly with a high degree of inter-facial adhesion so that the two frames will, in effect, be locked together. Moreover, the synthetic resin from which the inner and outer frames 1, 2, are molded should possess a limited amount of resiliency or flexibility so that by making the U-shaped flanges 6, 7, slightly thicker in the transverse dimension than the comparable dimension of the matching U-shaped grooves 15, 16, the press-fit will be snug and secure even though no effort is made to retain highly close dimensional tolerances. Similarly, the overall length and width of the inner frame 2 can be made slightly larger than the complementary dimensions of the outer frame so as to achieve a snug press-fit. Consequently, moderate amounts of distortion in size or shape which may result from ordinarily encountered changes in atmospheric conditions will not render the structure inoperative.

In use, a film transparency is mounted within the film-holding device which is, in turn, assembled in the manner as shown in FIG. 8. The film transparency is disposed within the film retaining pocket 10 and the viewable area of this transparency will appear through the rectilinear aperture 11. The inner frame 2 is next disposed over the outer frame 1 containing the film transparency. At this point, it is to be noted, that the U-shaped inner flanges 6, 7, are in marginal alignment with the U-shaped grooves 15, 16, respectively, and the exterior annular face 14 of the base 13 is in marginal alignment with the rectilinear groove 9. The two frames 1, 2, are pressed together and U-shaped flanges 6, 7, will tightly fit within the grooves 15, 16, and the annular face along the periphery of the rectilinear base 13 will frictionally engage the walls of the rectilinear groove 9, with a substantial amount of inter-facial adhesion. In this manner, the two frames 1, 2, are securely locked together and cannot be accidentally or unauthorizedly separated. The flat face 20 will engage one surface of the transparency margins while the upwardly presented surface of the pocket 10 will engage the opposite surface of the transparency, thereby retaining the transparency securely in place.

It is possible to provide a modified form of film-holding device B substantially as shown in FIGS. 9–16, and which includes an outer frame 22 and an inner frame 23, both of which have a rectilinear base and are preferably formed of synthetic resin material, such as plasticized rubber-polystyrene mixtures, polyethylene, or polypropylene.

The outer frame 22 comprises a base 24 provided around its entire periphery with an integral wall-forming flange 25 having an inclined interior face 26. Also integrally formed on the base 24 and extending outwardly therefrom are upstanding beads 27 which are spaced an equal distance from the inclined interior face 26, thereby defining a rectilinear groove 28 having at flat bottom wall 29. By reference to FIG. 10, it can be seen that each of the beads 27 is located on a corner of the groove 28 and, moreover, each of the beads 27 are provided with internally elongated grooves g. It will be noted by reference to FIG. 15 that the height of the beads 27 above the bottom wall 29 is less than the corresponding dimension of the wall-forming flange 25. Integrally formed on the base 24 adjacent one margin of the rectilinear groove 28 is a pair of spaced upstanding flanges 30 and integrally formed on the base 24 adjacent a margin of the groove 28, which is spaced and opposite from the last-named margin of the groove 28, is a pair of upstanding flanges 31. The height of the flanges 30, 31, are substantially equal to the height of the upstanding beads 27. Integrally formed with two of the beads 27 and extending perpendicularly therefrom are flanges 32 which are located in a straight line with the flanges 30. Also formed with the other two upstanding beads 27 are flanges 33 which are in alignment with the flanges 31, all as can best be seen in FIG. 10. The area of the base 24 which is bound by the beads 27 and the flanges 30, 31, 32, and 33, form a film-retaining pocket 34 which is centrally provided with a rectilinear aperture 35. By reference to FIG. 15 it can be seen that the groove 28 has a depth which is slightly greater than the film-retaining pocket 34.

Extending across the grooves 28 along one wall of the wall-forming flange 25 is a pair of upstanding ridges 36, and extending across the groove 28 along the wall of the flange 25 which is parallel to the aforementioned wall, is a pair of ridges 37.

The inner frame 23 comprises a rectilinear base 38 which is provided around its entire peripheral margin with an integral wall-forming flange 39 having an inclined exterior face 40, and which is adapted for snug-fitting telescopic disposition within the groove 28 of the outer frame 22. The base 38 is provided with four corner grooves 41 for snugly fitting around and embracing each of the beads 27 with the integrally formed flanges 32 and 33. Moreover, outwardly extending tongue-like elements 42 are integrally formed with the base of the grooves 41 and are sized for snug-fitting telescopic disposition within the grooves g of each of the beads 27. The base 38 is further provided with grooves 43 along one margin for snugly engaging the upstanding flanges 30 of the frame 22 and is provided along an opposing parallel margin with grooves 44 for snugly engaging the upstanding flanges 31 when the frames 22, 23, are pressed together. Within the area bounded by the corner grooves 41 and the grooves 43, 44, the inner frame 23 is provided with a flat face 45 which cooperates with the film-retaining pocket 34 to retain the film transparency securely in place. The base 38 is provided with a viewing aperture 46 which lies in marginal registration with the viewing aperture 35 when the outer and inner frames 22, 23, respectively, are disposed in assembled relation as shown in FIG. 9. The relative size of the interfitted parts of the outer frame 22 and the inner frame 23 are such that the exterior annular face 40 of the wall-forming flange 39 will fit snugly against the interior face 26 of the wall-forming flange 25. Similarly, the beads 27 and the connecting upstanding flanges 32, 33, of the outer frame 22 will fit snugly within the corner grooves 41 of the inner frame 23. Finally, the flanges 30, 31, of the outer frame 22 will fit snugly within the grooves 43, 44, respectively, of the inner frame 23. The wall-forming flange 39 of the upper frame 23 is provided with two recesses 47, 48, on each of two opposing margins for snugly accommodating each of the ridges 36, 37, respectively.

When the inner frame 23 is pressed into the outer frame 22 the abutting surfaces will fit together tightly with a high degree of inter-facial adhesion so that the two frames will, in effect, be locked together. Moreover, the synthetic resin from which the inner and outer frames 22, 23, are molded should possess a limited amount of resiliency or flexibility so that by making the flanges 30, 31, slightly thicker in transverse dimension than the comparable dimension of the matching grooves 43, 44, and by making the beads 27 slightly thicker in transverse dimension than the corner grooves 41, the press-fit will be snug and secure even though no effort is made to retain high close dimensional tolerance, just as in the case of the film-holding device A. A similar result can be obtained by making other dimensions of male elements slightly larger than the complementary dimensions of interfitting female elements. For instance, the beads 42 can be made slightly longer than the grooves g.

In use, the film-holding device B is assembled in the manner as shown in FIG. 16, similar to the manner of the assembly of the film-holding device A. The film transparency is disposed upon the film-retaining pocket 34 and the inner frame 23 is disposed over the outer frame 22. At this point, it is to be noted that the wall-forming flange 40 is in marginal alignment with the groove 28. Similarly, the upstanding beads and integrally forming flanges 32, 33, are in marginal aligment with the corner grooves 41. Also, the tongue-like elements 42 are in marginal alignment with the elongated grooves g and, finally, the flanges 30, 31, are in marginal alignment with the grooves 43, 44. The two frames 22, 23, are pressed together so that the beads 27 and the flanges 32, 33, fit snugly within the corner grooves 41. Similarly, the tongue-like elements 42 fit snugly within the grooves g and the flanges 30, 31, are snugly fitted within the grooves 43, 44.

It should be understood that changes and modifications in the form, construction, arrangement, and combination of the several parts of the film-holding devices, may be made and substituted for those herein shown and described without departing from the nature and principle of my invention.

Having thus described my invention, what I claim and desire to secure by Letters Patent is:

1. A film transparency holder comprising first and second frame members sized for marginal registration with each other, said first and second frame members being respectively provided with apertures sized for marginal registration with each other and with the peripheral margins of the viewable area of the film transparency which is to be mounted within the film holder, said first frame member being provided with a peripheral rim-flange and a rectangular pocket defined by a bottom face and smooth-surfaced side walls, the latter being inclined upwardly and outwardly from the bottom face of the pocket so that the opening of the pocket is larger at the top than at the bottom, the second frame member having a flat face surrounding and adjoining its rectangular aperture, which flat face is adapted for snug-fitting abutment against a film transparency disposed between such flat face and the bottom face of the first frame member, said second frame member having smooth-surfaced side faces extending around and defining its periphery, said side faces being inclined upwardly and outwardly with respect to the flat face so as to fit snugly and complementarily against the side walls of the pocket in the first frame member, the side faces and side walls being in tight engagement when the frame members are assembled together so that when the first and second frame members are pressed together the surfaces of said elements will abut tightly with a substantial amount of interfacial adhesion whereby the first and second frame members are, in effect, securely locked together against accidental or unauthorized separation.

2. A film transparency holder comprising first and second frame members each having centrally located rectangular apertures sized for marginal registration with each other and with the peripheral margins of the viewable area of the film transparency which is to be mounted within the film holder, said first and second frame members being respectively provided with telescopically interfitted elements, the interfitted element of the first frame member including a peripheral rim-flange and a rectangular pocket defined by a bottom face and smooth-surfaced side walls, the latter being inclined upwardly and outwardly from the bottom face of the pocket so that the opening of the pocket is larger at the top than at the bottom, the second frame member having a flat face surrounding and adjoining its rectangular aperture, which flat face is adapted for snug-fitting abutment against a film transparency disposed between such flat face and the bottom face of the first frame member, said second frame member having smooth-surfaced side faces extending around and defining its periphery, said side faces being inclined upwardly and outwardly with respect to the flat face so as to fit snugly and complementarily against the side walls of the pocket in the first frame member, the side faces and side walls being in tight engagement when the frame members are assembled together so that when the first and second frame members are pressed together the surfaces of said elements will abut tightly with a substantial amount of interfacial adhesion whereby the first and second frame members are, in effect, securely locked together against accidental or unauthorized separation.

3. A film transparency holder comprising a first frame member having a base having a flat bottom wall and a second frame member having a base, each of said bases having centrally located rectangular apertures sized for marginal registration with each other and with the peripheral margins of the viewable area of the film transparency which is to be mounted within the film holder, the base of said first frame member being provided with a peripheral wall and a rectangular groove, the base of the second frame member being provided with a peripheral wall which projects inwardly from its interior abutting face, the rectangular groove of said first frame member being defined by a bottom face and smooth-surfaced side walls, the latter being inclined upwardly and outwardly from the bottom face of the groove so that the opening of the groove is larger at the top than at the bottom, the second frame member having a flat face surrounding and adjoining its rectangular aperture, which flat face is adapted for snug-fitting abutment against a film transparency disposed between such flat face and the bottom face of the first frame member, said second frame member having smooth-surfaced side faces extending around and defining its periphery, said side faces being inclined upwardly and outwardly with respect to the flat face so as to fit snugly and complementarily against the side walls of the groove in the first frame member, the side faces and side walls being in tight engagement when the frame members are assembled together so that when the first and second frame members are pressed together the peripheral wall of said second frame will tightly fit within the rectangular groove of said first frame member with a substantial amount of interfacial adhesion whereby the first and second frame members are, in effect, securely locked together against accidental or unauthorized separation.

4. A film transparency holder comprising a first frame member having a base having a flat bottom wall and a second frame member having a base, each of said bases having centrally located rectangular apertures sized for marginal registration with each other and with the peripheral margins of the viewable area of the film transparency which is to be mounted within the film holder, the bases of said first frame member being provided with a peripheral wall and a rectangular groove, the base of the second frame member being provided with a peripheral wall which projects inwardly from its respective interior abutting face, the base of said second frame also being provided with a groove on its interior abutting face, and a flange integrally formed on the interior abutting face of the base of said first frame member, the groove of said first frame member being defined by a bottom face and smooth-surfaced side walls, the latter being inclined upwardly and outwardly from the bottom face of the groove so that the opening of the groove is larger at the top than at the bottom, the second frame member having a flat face surrounding and adjoining its rectangular aperture, which flat face is adapted for snug-fitting abutment against a film transparency disposed between such flat face and the bottom face of the first frame member, said second frame member having smooth-surfaced side faces extending around and defining its periphery, said side faces being inclined upwardly and outwardly with respect to the flat face so as to fit snugly and complementarily against the side walls of the groove in the first frame member, the side faces and side walls being in tight engagement when the frame members are assembled together so that when the first and second frame members are pressed together the peripheral wall of said second frame will tightly fit within the rectangular groove of said first frame member and the groove of said second frame being sized so that the flange of said first frame member will tightly fit within the groove of said second frame member with a substantial amount of interfacial adhesion whereby the first and second frame members are, in effect, securely locked together against accidental or unauthorized separation.

5. A film transparency holder comprising a first frame member having a base having a flat bottom wall and a second frame member having a base, each of said bases having centrally located rectangular apertures sized for marginal registration with each other and with the peripheral margins of the viewable area of the film transparency which is to be mounted within the film holder, the base of said first frame member being provided with a peripheral wall and a rectangular groove, the base of the second frame member being provided with a peripheral wall which projects inwardly from the respective interior abutting face, the base of said second frame also being provided with a pair of spaced U-shaped grooves on its interior abutting face, and a pair of spaced U-shaped flanges integrally formed on the interior abutting face of the base of said first frame member, the groove of said first frame member being defined by a bottom face and smooth-surfaced side walls, the latter being inclined upwardly and outwardly from the bottom face of the groove so that the opening of the groove is larger at the top than at the bottom, the second frame member having a flat face surrounding and adjoining its rectangular aperture, which flat face is adapted for snug-fitting abutment against a film transparency disposed between such flat face and the bottom face of the first frame member, said second frame member having smooth-surfaced side faces extending around and defining its periphery, said side faces being inclined upwardly and outwardly with respect to the flat face so as to fit snugly and complementarily against the side walls of the groove in the first frame member, the side faces and side walls being in tight engagement when the frame members are assembled together so that when the first and second frame members are pressed together the peripheral wall of said second frame will tightly fit within the rectangular groove of said first frame member and the groove of said second frame being sized so that the flange of said first frame member will tightly fit within the grooves of said second frame member with a substantial amount of interfacial adhesion whereby the first and second frame members are, in effect, securely locked together against accidental or unauthorized separation.

6. A film transparency holder comprising first and second frame members formed of a synthetic resin material capable of providing a large amount of interfacial adhesion, each of said members having centrally located rectangular apertures sized for marginal registration with each other and with the peripheral margins of the viewable area of the film transparency which is to be mounted within the film holder, said first frame member being provided with a plurality of flange elements projecting inwardly from its interior abutting face along two opposed parallel margins thereof, said second frame member being provided with a plurality of grooves formed in its interior abutting face along two opposed parallel margins thereof, said grooves being defined by a bottom face and smooth-surfaced side walls, the latter being inclined upwardly and outwardly from the bottom face of the groove so that the opening of the groove is larger at the top than at the bottom, the second frame member having a flat face surrounding and adjoining its rectangular aperture, which flat face is adapted for snug-fitting abutment against a film transparency disposed between such flat face and the bottom face of the first frame member, said second frame member having smooth-surfaced side faces extending around and defining its periphery, said side faces being inclined upwardly and outwardly with respect to the flat face so as to fit snugly and complementarily against the side walls of the groove in the first frame member, the side faces and side walls being in tight engagement when the frame members are assembled together so that when the first and second frame members are pressed together the flange elements of the first frame will tightly fit within the grooves of the second frame with a substantial amount of interfacial adhesion whereby the first and second frame members are, in effect, securely locked together against accidental or unauthorized separation.

7. A film transparency holder comprising a first frame member having a base and a second frame member having a base, each of said bases having centrally located rectangular apertures sized for marginal registration with each other and with the peripheral margins of the viewable area of the film transparency which is to be mounted within the film holder, the base of said first frame member being provided with a peripheral rim-flange and a rectangular pocket defined by a bottom wall and smooth-surfaced side walls, the latter being inclined upwardly and outwardly from the bottom wall of the pocket so that the opening of the pocket is larger at the top than at the bottom, said pocket also being provided with a plurality of upstanding L-shaped flanges, the side walls of which are substantially perpendicular to the bottom wall so that there are no undercuts in the pocket or its flanges, said second frame having a top face, a bottom face and smooth-surfaced rectilinear side walls shaped so as to fit snugly and complementarily within the pocket, the side walls of the second frame being inclined inwardly in relation to the top face at an angle of inclination which matches the angle of inclination of the side walls of the pocket so that the area defined by the perimeter of the top face is larger than the area defined by the perimeter of the bottom face, the second frame also having grooves shaped to match the L-shaped flanges of the first frame, the side walls of the grooves being substantially perpendicular to the plane of the top face so that when the first and second frame members are pressed together the peripheral wall of said frame will tightly fit within the rectangular pocket of said first frame member and the grooves of said second frame being sized so that the flanges of said first frame member will tightly fit within the grooves of said second frame member with a substantial amount of interfacial adhesion whereby the first and second frame members are, in effect, securely locked together against accidental or unauthorized separation.

8. A film transparency holder comprising first and second frame members of a synthetic resin material from a class consisting of plasticized rubber-polystyrene mixtures, polyethylene, and polypropylene, each of said members having centrally located rectangular apertures sized for marginal registration with each other, said first member having opposite flat faces and being provided in one such flat face with a female socket-means consisting of opposed side walls which are connected interiorly by a bottom wall and extend toward such flat face to form a slot-like opening having a transverse width that is at no point smaller than the transverse width of the bottom wall so that said socket-means is not undercut in any way, said second frame being provided with projecting male means sized and shaped for precise interfitting disposition within the socket-means of the first member, said male means having oppositely presented side faces and a top face, said side faces being adapted to fit tightly in face-wise abutment against the side walls of the female socket-means and said top face being adapted to fit tightly in face-wise abutment against the bottom wall of the female socket-means, the transverse thickness of the male means being at all points at least as great as its transverse thickness in the region of its top face so that the male means is not undercut in any way and can be pressed into the female socket-means without snap-fitting deformation of either the female socket-means or the male means whereby said side walls and side faces will be tightly engaged with a substantial amount of interfacial adhesion whereby the first and second frame members are, in effect, securely locked together against accidental or unauthorized separation.

9. A film transparency holder according to claim 7 in which the upstanding L-shaped flanges are shorter in height than the rim-flange and have transverse top surfaces which are below the plane of the opening of the pocket.

References Cited in the file of this patent

UNITED STATES PATENTS

| | | |
|---|---|---|
| 2,528,366 | Houston | Oct. 31, 1950 |
| 2,837,854 | Bing et al. | June 10, 1958 |
| 2,889,645 | Thieme | June 9, 1959 |
| 2,959,882 | Krull | Nov. 15, 1960 |